Patented Apr. 21, 1953

2,636,013

UNITED STATES PATENT OFFICE 2,636,013

METHOD OF MAKING AN ABRASIVE SPONGE MATERIAL AND THE PRODUCT RESULTING THEREFROM

Christopher L. Wilson, Columbus, Ohio, and George H. Schilling, Benton Harbor, Mich.; said Schilling assignor, by mesne assignments, to said Wilson No Drawing. Application May 4, 1951, Serial No. 224,654

9 Claims. (Cl. 260—2.5)

This invention relates to a method of making an abrasive sponge material and the product resulting therefrom.

In the copending application of Christopher L. Wilson, Serial No. 29,657, filed May 27, 1948, now Patent No. 2,609,347, patented September 2, 1952, there is described and claimed methods of making expanded sponge materials by forming dispersed bubbles in a solution comprising polyvinyl alcohol and reacting the alcohol with formaldehyde or a material capable of releasing formaldehyde while the bubbles are present. In this method the solution of polyvinyl alcohol is preferably an aqueous solution and a homogeneous froth of dispersed discrete bubbles is formed therein. The polyvinyl alcohol is one containing less than 10% residual hydrolyzable material in the molecule. After the froth has been made it is maintained substantially stable and the alcohol is reacted with formaldehyde to bring about a gelation and solidification of the froth with a limited and partial coalescing of the bubbles simultaneously with the progression of the reaction. This reaction between the polyvinyl alcohol and formaldehyde takes place in the presence of an acid catalyst and is permitted to proceed until approximately 35 to 80%, and preferably 40 to 70%, of the hydroxyl groups of the alcohol have been reacted. The sponge material is then washed free of acid and unreacted ingredients to produce a strong, inert, highly absorptive sponge.

In preparing the froth of polyvinyl alcohol, a froth stabilizing wetting agent is preferably used in order to maintain the froth stable during the reaction period except, of course, for the limited and partial coalescing of the bubbles. Typical foam stabilizing wetting agents are disclosed in the above copending application.

We have discovered that a sponge material may be made according to the method described above with this sponge material having a rough-feeling abrasive surface if the reactants have a finely divided material comprising polyvinyl formal added thereto prior to the completion of the reaction. This polyvinyl formal material may comprise ground scrap from a previously prepared batch of the sponge material. The particles are held by the polyvinyl alcohol-formaldehyde reaction product sponge and give an abrasive feel to the sponge material. Thus, the finely divided polyvinyl formal material or ground scrap serves as a filler for the sponge.

The ground scrap or polyvinyl formal material serves to increase the bulk of the sponge material thus resulting in considerable savings. In general, up to about 20% by weight of the polyvinyl alcohol can be replaced with ground scrap from a previous sponge batch. If very much more than this amount is used, the resulting sponge will be somewhat weak. In commercial production it is preferred that the ground scrap or finely divided polyvinyl formal be in the form of particles substantially all of which have a maximum particle size of about 4 mesh. It is preferred, however, that finer material be used as stronger sponges are produced. The best sponges appear to result from using ground scrap of about 10 to 20 mesh maximum size. Some sponges have been made with scrap ground from 30 to 40 mesh but these are not preferred as the surface of the resulting sponge is not sufficiently abrasive.

The new sponges may be prepared as described in the above mentioned Wilson copending application 29,657 and by the examples given therein. The only difference is that ground scrap or expanded material comprising polyvinyl formal is added to the reacting mass before the completion of the reaction producing the sponge. In general, a water solution of polyvinyl alcohol is mixed with an acid catalyst, a foaming agent, formaldehyde and ground scrap preferably dried. The foaming agent may be any of the foam stabilizing wetting agents described in the copending Wilson application. The ground scrap is preferably, but not necessarily, moistened with water before being added to the reacting mass. As soon as all ingredients have been added the solution of the reactants is expanded such as by beating to a froth of maximum volume. The reaction is then permitted to go to completion and at the end of the reaction time the acid, foaming agent and unreacted materials are washed from the sponge. Typical examples of reactant mixture used in making sponges according to this invention are as follows:

*Example 1.*—Sponge material was made according to the above method employing the following ingredients: 100 grams of a 12.5% polyvinyl alcohol solution in water, 55 cc. of 55% sulfuric acid in water, 2 cc. of a foaming agent, 5.5 grams of dried ground scrap (tan), 0.125 gram of tan pigment and 10 grams of paraformaldehyde.

*Example 2.*—Sponge material was made according to the above method employing the following ingredients: 115 grams of a 12.5% polyvinyl alcohol solution in water, 55 cc. of 55% sulfuric acid in water, 2 cc. of a foaming agent, 4 grams of dried ground scrap, mixed colors, 15-20 mesh, and 10 grams of paraformaldehyde.

*Example 3.*—Sponge material was made according to the above method employing the following ingredients: 115 grams of a 12.5% polyvinyl alcohol solution in water, 55 cc. of 55% sulfuric acid in water, 2 cc. of a foaming agent, 4 grams of dried ground scrap, mixed colors, 20-30 mesh and 10 grams of paraformaldehyde.

*Example 4.*—Sponge material was made according to the above method employing the following ingredients: 115 grams of a 12.5% polyvinyl alcohol solution in water, 55 cc. of 55% sulfuric acid in water, 2 cc. of a foaming agent, 4 grams of dried scrap, mixed colors, 30-50 mesh, and 10 grams of paraformaldehyde.

Having described our invention as related to the embodiments set out herein, it is our intention that the invention be not limited by any of the details of description unless otherwise specified but rather be construed broadly within its spirit and scope as set out in the accompanying claims.

We claim:

1. In the preparation of a sponge material, the method which comprises reacting polyvinyl alcohol and formaldehyde in a frothed aqueous solution thereof containing an acid catalyst, and adding a finely divided material comprising polyvinyl formal to the solution prior to the completion of the reaction.

2. In the preparation of a sponge material, the method which comprises reacting polyvinyl alcohol and formaldehyde in a frothed aqueous solution thereof containing an acid catalyst, and adding a finely divided material comprising polyvinyl formal to the solution prior to the completion of the reaction, said material comprising ground scrap from a previously prepared batch of said sponge material.

3. In the preparation of a sponge material, the method which comprises reacting polyvinyl alcohol and formaldehyde in a frothed aqueous solution thereof containing an acid catalyst, and adding a finely divided material comprising polyvinyl formal to the solution prior to the completion of the reaction, the maximum particle size of said material being about four mesh.

4. In the preparation of a sponge material, the method which comprises reacting polyvinyl alcohol and formaldehyde in a frothed aqueous solution thereof containing an acid catalyst, and adding a finely divided material comprising polyvinyl formal to the solution prior to the completion of the reaction, said finely divided material comprising scrap from a previously prepared batch of the sponge material finely divided to a maximum particle size of about four mesh.

5. A porous sponge material comprising the reaction product of polyvinyl alcohol and formaldehyde in which from about 35 to 80% of the hydroxyl groups are reacted and containing dispersed particles comprising polyvinyl formal linked to the reaction product.

6. A porous sponge material comprising the reaction product of polyvinyl alcohol and formaldehyde in which from about 35 to 80% of the hydroxyl groups are reacted and containing dispersed particles comprising polyvinyl formal, said particles being present in an amount up to 20% by weight and linked to the reaction product.

7. A porous sponge material comprising the reaction product of polyvinyl alcohol and formaldehyde in which from about 35 to 80% of the hydroxyl groups are reacted and containing dispersed particles comprising polyvinyl formal, said particles being present in an amount up to 20% by weight and linked to the reaction product, said particles having a maximum particle size of about four mesh.

8. A porous sponge material comprising the reaction product of polyvinyl alcohol and formaldehyde in which from about 35 to 80% of the hydroxyl groups are reacted and containing dispersed particles comprising polyvinyl formal linked to the reaction product, said particles comprising scrap from a previously prepared batch of the sponge material finely divided to a maximum particle size of about four mesh.

9. A porous sponge material comprising the reaction product of polyvinyl alcohol and formaldehyde in which from about 35 to 80% of the hydroxyl groups are reacted and containing dispersed particles comprising polyvinyl formal, said particles being present in an amount up to 20% by weight and linked to the reaction product, said particles comprising scrap from a previously prepared batch of the sponge material finely divided to a maximum particle size of about four mesh.

CHRISTOPHER L. WILSON.
GEORGE H. SCHILLING.

References Cited in the file of this patent

FOREIGN PATENTS

| Number | Country | Date |
|--------|---------|------|
| 769,011 | France | June 5, 1934 |